United States Patent [19]

Chen

[11] Patent Number: 5,365,387
[45] Date of Patent: Nov. 15, 1994

[54] AUTOMATIC VIDEO TAPE CONVERTER

[75] Inventor: Stephen Chen, Changhua City, Taiwan, Prov. of China

[73] Assignee: E Lead Electronic Co. Ltd., Changhua City, Taiwan, Prov. of China

[21] Appl. No.: 11,223

[22] Filed: Jan. 29, 1993

[51] Int. Cl.⁵ .................... G11B 15/665; G11B 23/08
[52] U.S. Cl. ........................................ 360/94; 360/132
[58] Field of Search ............... 360/93, 94, 95, 96.5, 360/132

[56] References Cited

U.S. PATENT DOCUMENTS

| | | | |
|---|---|---|---|
| 4,476,505 | 10/1984 | Ogata et al. | 360/94 |
| 4,479,618 | 10/1984 | Okada et al. | 360/94 |
| 4,802,048 | 1/1989 | Perkins et al. | 360/132 |
| 4,994,929 | 2/1991 | Chen | 360/94 |
| 5,034,832 | 7/1991 | Sato et al. | 360/94 |
| 5,173,818 | 12/1992 | Chan | 360/94 |

FOREIGN PATENT DOCUMENTS 58-88863  5/1983  Japan ................ 360/94
58-212676 12/1983 Japan ................ 360/94

*Primary Examiner*—A. J. Heinz
*Assistant Examiner*—David L. Ometz
*Attorney, Agent, or Firm*—Browdy and Neimark

[57] ABSTRACT

An automatic video tape converter which is capable of converting a camera-used video tape into a general video tape suitable for a common video player to play, wherein a rotary shaft is disposed at a corner of a drive cover, permitting the same to be opened/closed in an arch rotary manner instead of the conventional straight pushing manner, whereby a user can easily and smoothly operate the drive cover and in case the drive cover is not completely moved to a true close position, one corner of the drive cover will protrude outside the converter to prevent the same from being inserted into the video player and thus avoid damage of the tape member of the video tape.

1 Claim, 6 Drawing Sheets

1

AUTOMATIC VIDEO TAPE CONVERTER

BACKGROUND OF THE INVENTION

A conventional video tape converter is disclosed in U.S. Pat. No. 4,994,929 as shown in FIG. 1, which is capable of converting camera-used video tape into general video tape suitable for a common video player to play, wherein a pair of corresponding guide grooves are formed on a box body for a drive cover having a rack portion to slidably associate with. A winding mechanism and left and right arm members and fixing blocks being disposed in the box body, whereby when the video tape is placed therein, the drive cover can move forward or backward to push the winding mechanism and outward swing the left and right arm members, making the same fixedly engaged with the fixing blocks, or to make the winding mechanism reversely wind the tape member of video tape therein.

In the above arrangement, the left and right arm members are engaged with the fixing blocks when the drive cover is completely pushed into the box body. As a result, in case the drive cover is not entirely pushed into the box body due to the user's negligence, the arm members will not be fixedly located. At this time, the shaft rod of the arm menders will be tilted by the pulling force of the tape member wound by the winding mechanism and thus damage the tape member. Moreover, the drive cover of the above arrangement is often unable to slide smoothly within the guide grooves due to the uneven force exerted thereon leftward and rightward.

SUMMARY OF THE INVENTION

It is therefore an object of the present invention to provide an improved automatic video tape converter to solve the aforesaid problems, wherein a rotary shaft is disposed at a corner of the drive cover to change the conventional straight pushing movement of the drive cover into an arch rotating movement so that a user only needs to exert force on a free side of the drive cover for smoothly operate the same. Furthermore, before the drive cover is entirely rotated into the box body, the drive cover protrudes from one side of the converter to prevent the user from inserting the converter into a video player.

Figure 1:
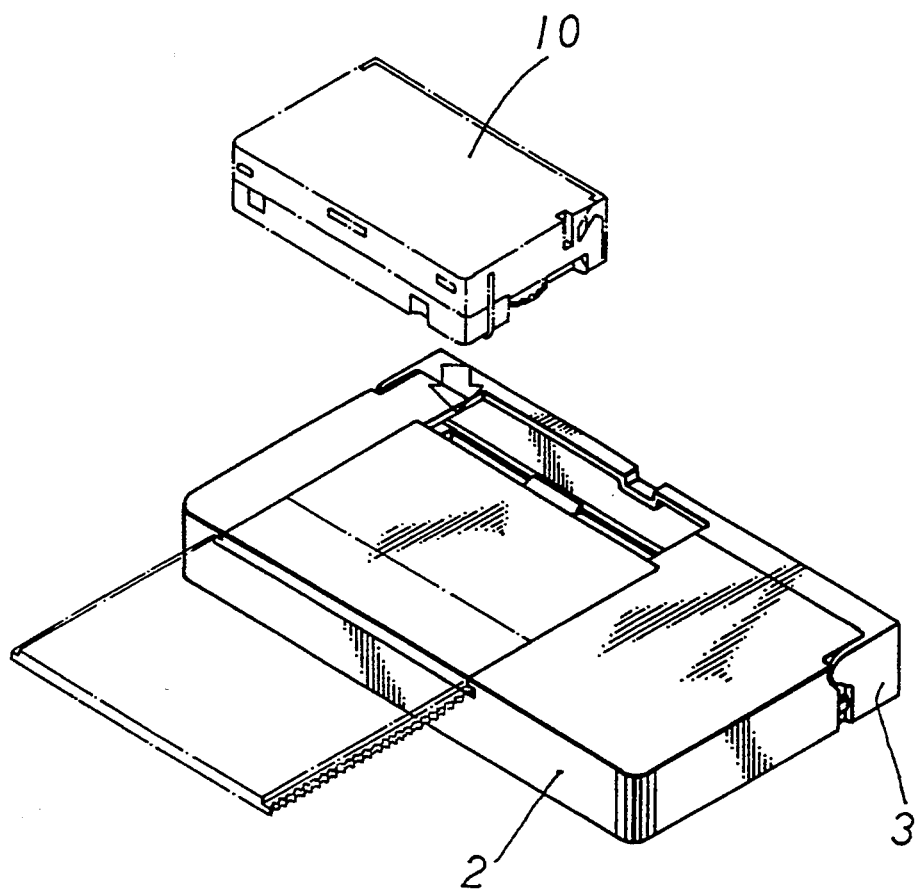
FIG. 1 shows that the conventional drive cover is opened in a straight pushing manner.
Figure 2:
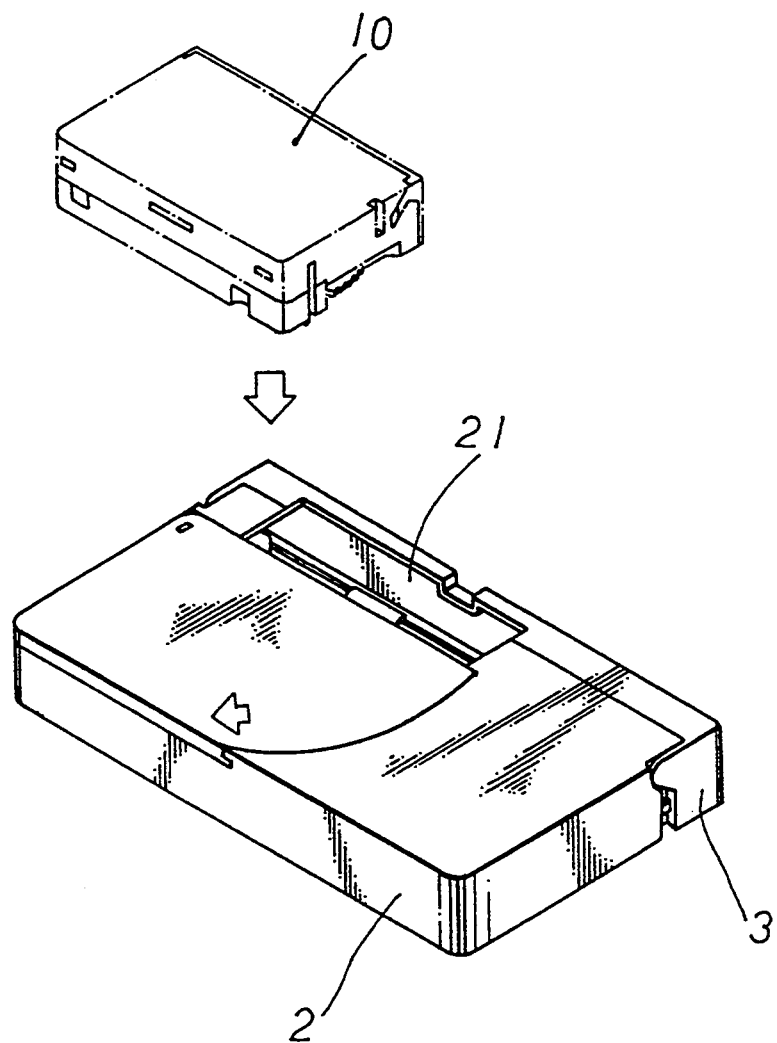
FIGS. 2 and 3 show that the drive cover of the present invention is opened in an arch rotating manner.
Figure 3:
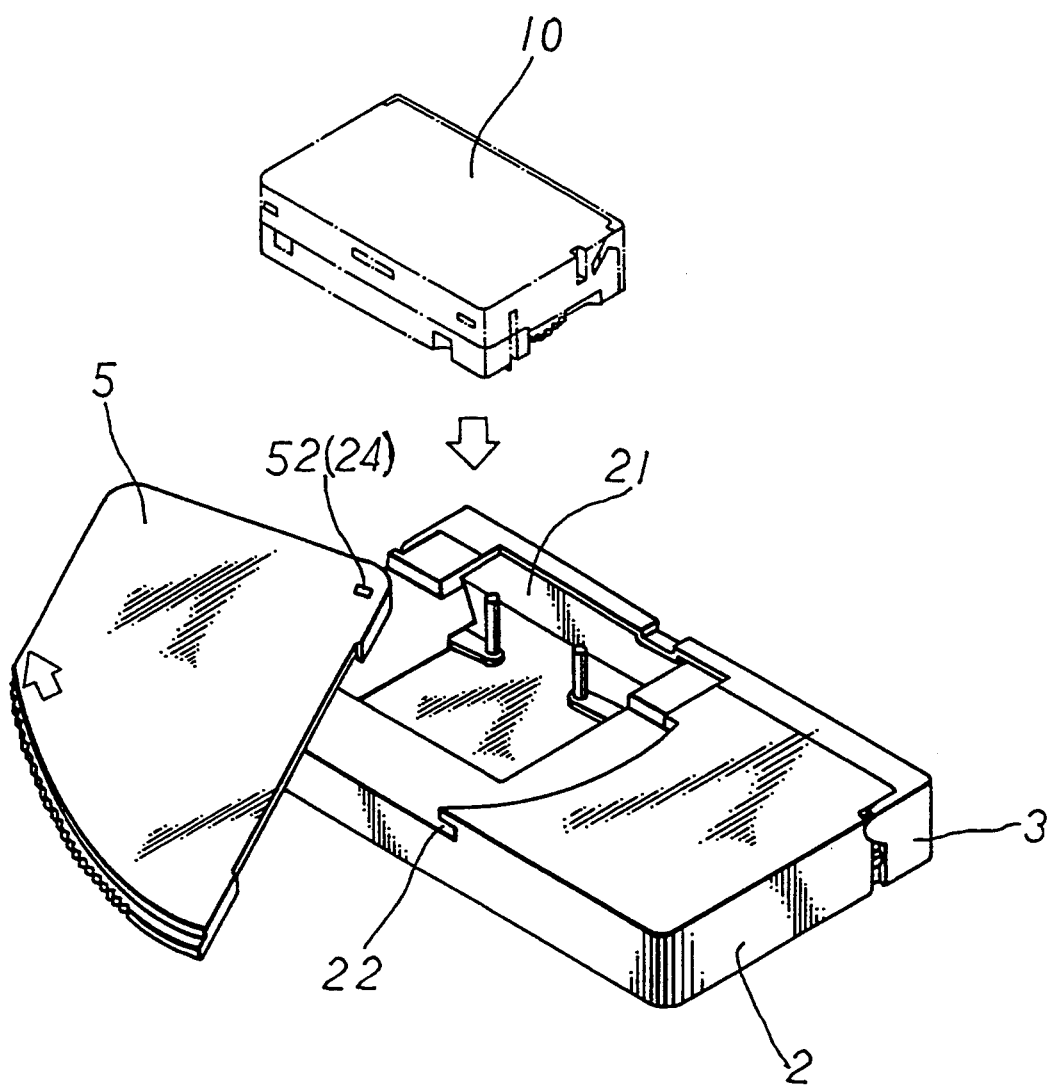

DETAILED DESCRIPTION OF THE PREFERRED EMBODIMENTS please refer to FIGS. 2 and 3, wherein the drive cover is disposed with a rotary shaft at a corner thereof so that the drive cover can be rotarily opened through an arch line by pushing/pulling a free side thereof. If the drive cover is not completely associated with the box body, i.e., the drive cover is not located in alignment with the box body, a part of the drive cover will protrude outside the box body so that the converter is prevented from being placed into the deck of the video player. Therefore, the user must assure that the drive cover is actually located at its true position before placing the converter into the video player so that the tape member of the video tape is protected from damage.

Figure 4:
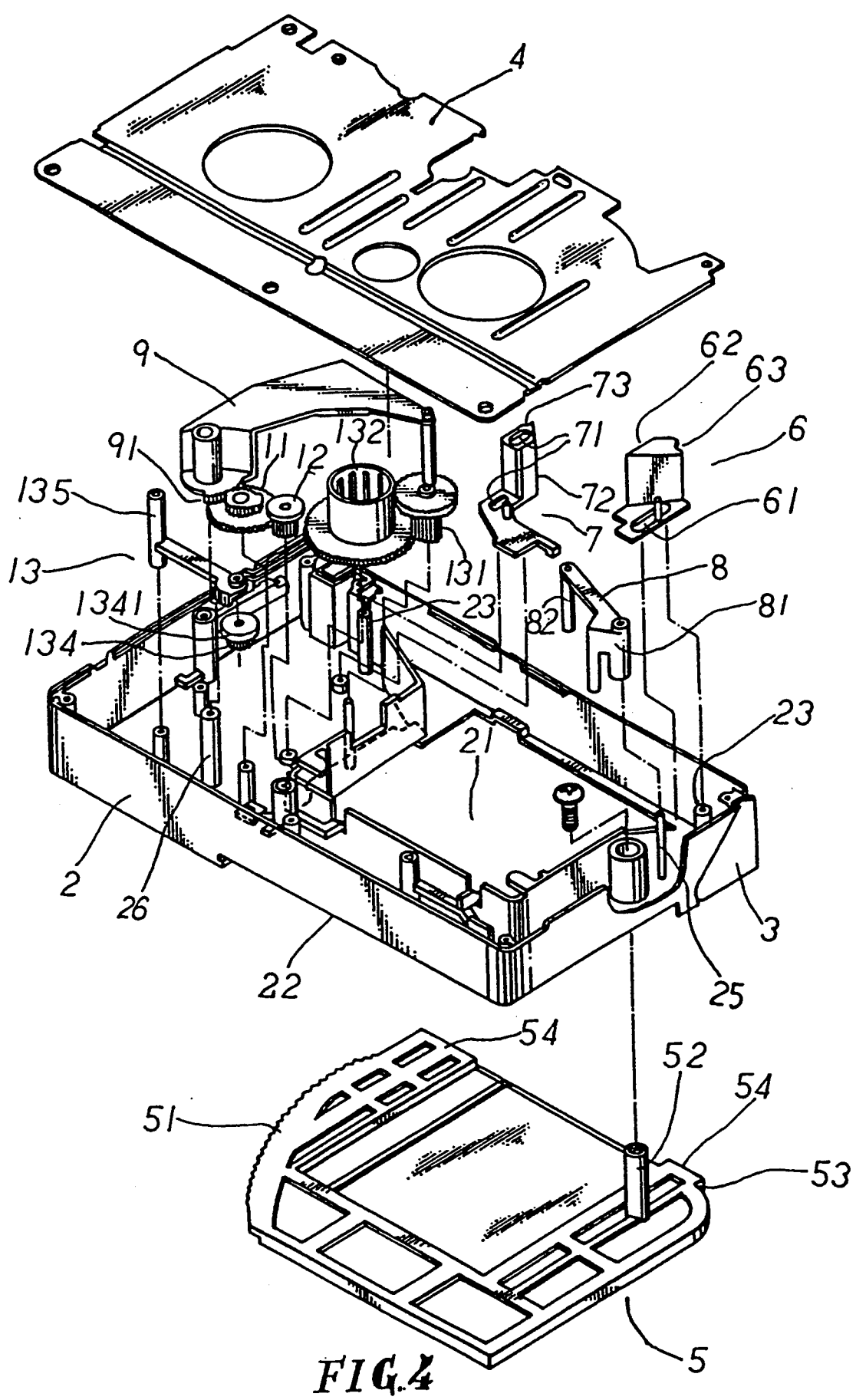
FIG. 4 is a partial perspective exploded view of the present invention.
Figure 5:
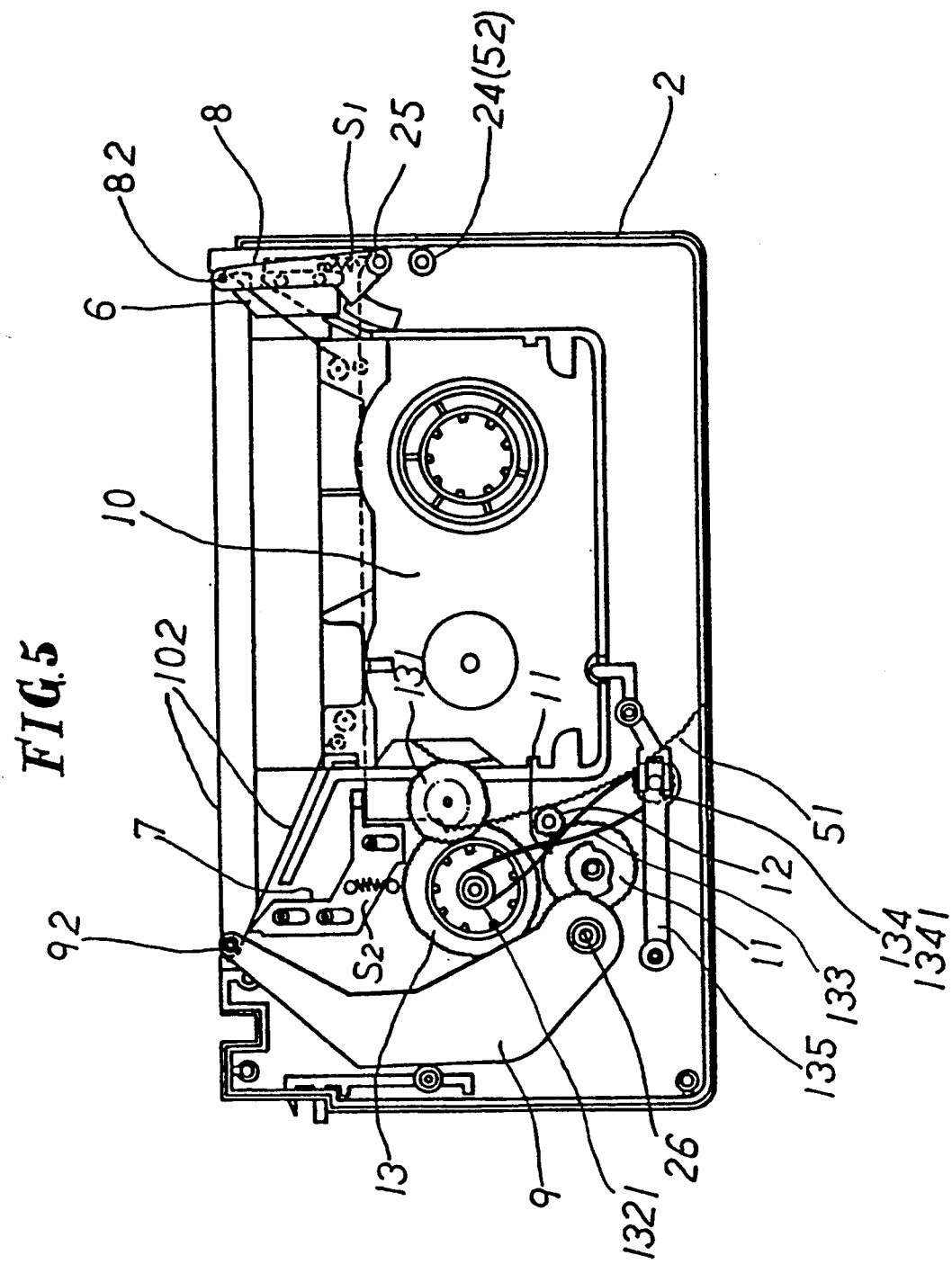
FIG. 5 shows the automatic videotape convertor according to the invention in and operating position.

FIGS. 4 and 5 show a preferred embodiment of the present invention and the operation thereof, wherein the gears 11, 12 and the winding mechanism 13 are arranged to cooperate with the lateral rack 51 of the drive cover 5. A front cover 3 is pivotably disposed on a front side of a box body 2. A bottom cover 4 is disposed at the bottom of the box body 2. A camera-used video tape 10 is disposed into the box body 2 through an opening 21 formed on the upper side thereof as shown in FIGS. 2 and 3. A sleeve 24 is disposed on a left front side of the opening 21 for the rotary shaft 52 of the drive cover 5 to rotate therein. On the right side of the opening 21 is formed an arch guide groove 22 which centers about the sleeve 24 and the rotary shaft 52 and movably receives the lateral rack 51 of the drive cover 5, whereby when the drive cover 5 rotates about the sleeve 24, the rack 51 can smoothly move within the guide groove 22 to close/open the opening 21 of the box body 2. On two sides of the opening 21 inside the box body 2 are disposed two rotary shafts 25, 26 for a left and a right arm members 8, 9 to freely rotate thereabout so that when the drive cover 5 is moved inwardly, a projection 53 beside the rotary shaft 52 of the drive cover 5 touches and pushes a lower portion 81 of the left arm member 8 so as to outwardly swing the same and thus drive a shaft rod 82 to stretch the tape member 102. Meanwhile, the rack 51 of the drive cover 5 through the idle gear 12 and gear 11 and the winding mechanism 13 drives the gear 91 of the right arm member 9 and thus outwardly swings the same. The shaft rods 82, 92 of the left and right arm members 8, 9 synchronously stretch the tape member 102. Inside the box body 2 on left and right front sides thereof are disposed a pair of guide posts 23 which are received in guide holes 61, 71 of a pair of fixing blocks 6, 7. The fixing blocks 6, 7 are restricted by springs S1, S2 and can be moved forward and automatically move back. On the opposite upper sections of the left and right fixing blocks 6, 7 are formed slant guide surfaces 62, 72. Behind the guide surfaces 62, 72 are disposed fixing grooves 63, 73. The rear end surfaces thereof can be pushed by the front end of the drive cover 5. The winding mechanism 13 includes a second idle gear 131 engaging with a second driving gear 132 which is disposed with a pulley 1321 for a belt 133 to fit therewith. The belt 133 further fits with a pulley 1341 of a third driving gear 134 which is in turn pivotally connected with one end of a rod member 135 and engaged with the rack 51 of the drive cover 5. The other end of the rod member 135 is pivotally connected with the box body 2 so that when the drive cover 5 is moved forwardly, both the rod member 135 and the third driving gear 134 are displaced forward to loosen the belt 133. At this time, the second driving gear 132 cannot be rotarily driven. Reversely, the third driving gear 134 and the rod member 135 can otherwise displace to tighten the belt 133 so as to rotarily drive the second driving gear 132 and second idle gear 131.

When the left and right arm members 8, 9 are opened to a fixed position, the drive cover 5 can continuously move inward with the front edge 54 thereof pushing the fixing blocks 6, 7 forward, making the fixing grooves 63, 73 of the fixing blocks 6, 7 clamp and fix the shaft rod 82, 92 of the left and right arm members 8, 9. At this time, the camera-used video tape is completely converted into a general video tape. When it is desired to take out the camera-used video tape from the converter, the user only needs to reversely operate the converter.

Figure 6:
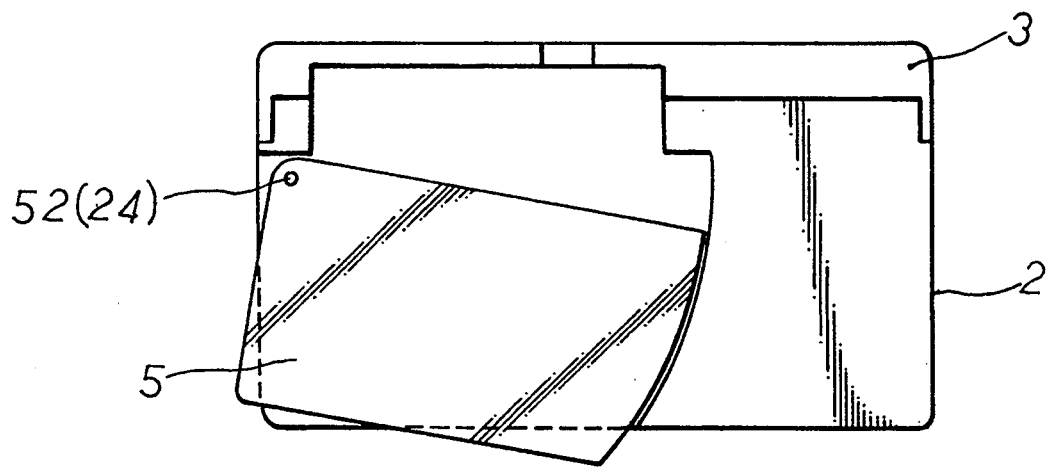
FIGS. 6-8 show that the drive cover of the present invention can be opened in different manners.
Figure 7:
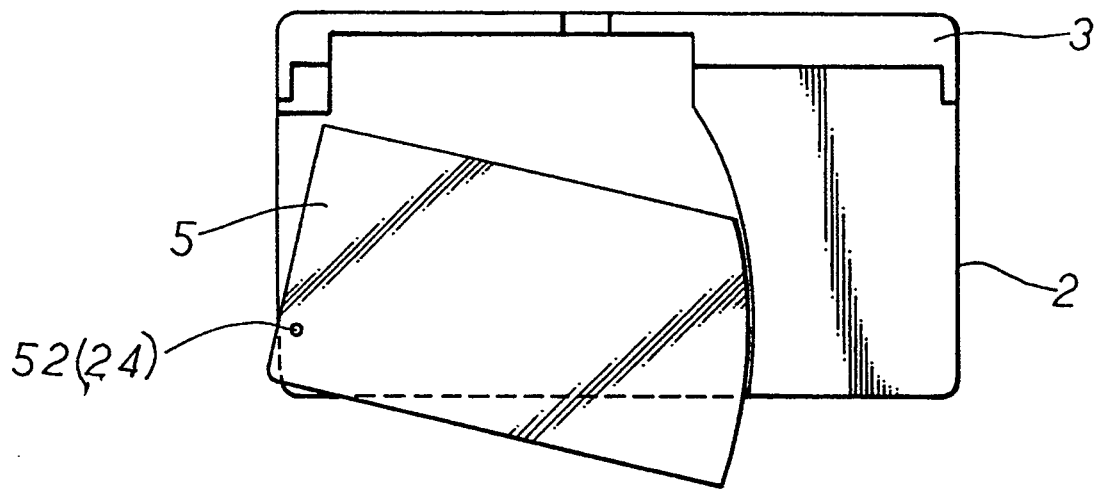
Figure 8:
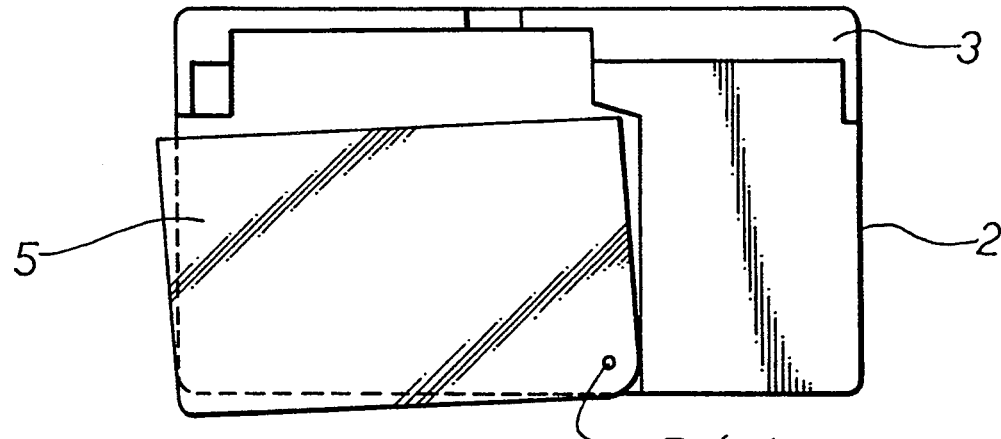

According to the above arrangement and as shown in FIGS. 6, 7 and 8, if the drive cover 5 is not entirely associated with the box body 2, one corner of the drive cover 5 will protrude outside the converter to prevent the same from being inserted into the video player and thus avoid damage of the tape member. In addition, since the drive cover 5 is operated in rotary manner instead of the conventional sliding manner, the drive cover 5 can be more smoothly moved.

I claim:

1. An improved automatic video tape converter, comprising a box body, a front cover and a bottom cover, wherein an opening is formed on said box body, through which a camera-used video tape cassette can be placed into said box body, a drive cover having a lateral rack portion and a rotary shaft at one corner pivotably disposed over said opening, wherein when said rack portion of said drive cover is engaged by a winding mechanism and driving gears to rotate the cover from an open to a closed position and back to an open position, a right arm member cooperates with a left arm member and left and right fixing blocks to move the tape in the camera-used tape cassette out of said cassette to a stretched orientation, wherein said rotary shaft of said drive cover permits the same to be smoothly opened/closed in an arc rotary manner and when said drive cover is not completely closed, one corner thereof will protrude outside said box body and prevent the same from being inserted into a video player.

* * * * *